US008539458B2

(12) United States Patent
Zhu et al.

(10) Patent No.: US 8,539,458 B2
(45) Date of Patent: Sep. 17, 2013

(54) TRANSFORMING ADDRESSING ALIGNMENT DURING CODE GENERATION

(75) Inventors: Weirong Zhu, Issaquah, WA (US); Yosseff Levanoni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 13/158,077

(22) Filed: Jun. 10, 2011

(65) Prior Publication Data
US 2012/0317394 A1  Dec. 13, 2012

(51) Int. Cl.
G06F 9/44 (2006.01)
G06F 9/45 (2006.01)
G06F 7/38 (2006.01)
G06F 9/00 (2006.01)

(52) U.S. Cl.
USPC ........... 717/136; 717/101; 717/116; 717/123; 717/128; 717/137; 717/146; 717/159; 712/228

(58) Field of Classification Search
None
See application file for complete search history.

(56) References Cited

U.S. PATENT DOCUMENTS

| | | | | | |
|---|---|---|---|---|---|
| 4,493,027 | A | * | 1/1985 | Katz et al. | 712/228 |
| 6,021,275 | A | * | 2/2000 | Horwat | 717/159 |
| 6,071,317 | A | * | 6/2000 | Nagel | 717/128 |
| 6,081,665 | A | * | 6/2000 | Nilsen et al. | 717/116 |
| 6,502,237 | B1 | * | 12/2002 | Yates et al. | 717/136 |
| 6,809,732 | B2 | | 10/2004 | Zatz | |
| 6,988,264 | B2 | | 1/2006 | Sarma | |
| 7,111,290 | B1 | * | 9/2006 | Yates et al. | 717/158 |
| 7,600,155 | B1 | | 10/2009 | Nickolls et al. | |
| 8,146,061 | B2 | | 3/2012 | Xu et al. | |
| 8,166,450 | B2 | * | 4/2012 | Fuhler et al. | 717/101 |
| 8,429,617 | B2 | | 4/2013 | Demetriou et al. | |
| 2003/0145282 | A1 | * | 7/2003 | Thomas et al. | 717/123 |
| 2003/0145310 | A1 | * | 7/2003 | Thames et al. | 717/123 |
| 2003/0163801 | A1 | * | 8/2003 | Thames et al. | 717/123 |
| 2004/0205747 | A1 | | 10/2004 | Bernstein et al. | |
| 2004/0268331 | A1 | * | 12/2004 | Mitchell et al. | 717/146 |
| 2005/0066308 | A1 | | 3/2005 | Han | |
| 2005/0097399 | A1 | | 5/2005 | Bliss et al. | |
| 2006/0048098 | A1 | | 3/2006 | Gatlin et al. | |
| 2006/0069953 | A1 | | 3/2006 | Lippett et al. | |
| 2006/0082577 | A1 | | 4/2006 | Carter | |

(Continued)

OTHER PUBLICATIONS

George C. Necula et al., CIL: Intermediate Language and Tools for Analysis and Transfomrations for C Programs, 2002 [Retrieved on Feb. 27, 2013]. Retrieved from the internet: <URL:http://download.springer.com/static/pdf/221/chp°/0253A10.1007%252F3-540-45937-5_16.pdf?auth66=1363282191_a5b9292a8db54ed128fc73f24ab0ad1b&ext=.pdf> 16 Pages (213-228).*

(Continued)

*Primary Examiner* — Don Wong
*Assistant Examiner* — Anibal Rivera
(74) *Attorney, Agent, or Firm* — Workman Nydegger

(57) ABSTRACT

The present invention extends to methods, systems, and computer program products for changing addressing mode during code generation. Generally, embodiments of the invention use a compiler transformation to transform lower level code from one address alignment to another address alignment. The transformation can be based upon assumptions of a source programming language. Based on the assumptions, the transformation can eliminate arithmetic operations that compensate for different addressing alignment, resulting in more efficient code. Some particular embodiments use a compiler transformation to transform an Intermediate Representation ("IR") from one-byte addressing alignment into multi-byte (e.g., four-byte) addressing alignment.

20 Claims, 5 Drawing Sheets

(56) References Cited

U.S. PATENT DOCUMENTS

| | | | |
|---|---|---|---|
| 2006/0107250 A1 | 5/2006 | Tarditi | |
| 2007/0018980 A1 | 1/2007 | Berteig | |
| 2007/0271553 A1* | 11/2007 | Higgins et al. | 717/136 |
| 2009/0006895 A1 | 1/2009 | May et al. | |
| 2009/0282390 A1 | 11/2009 | Geselowitz | |
| 2009/0307667 A1 | 12/2009 | Booth et al. | |
| 2009/0322751 A1 | 12/2009 | Oneppo | |
| 2010/0131934 A1* | 5/2010 | Kim et al. | 717/137 |
| 2010/0149185 A1 | 6/2010 | Capewell | |
| 2011/0072309 A1 | 3/2011 | Sakai et al. | |

OTHER PUBLICATIONS

Debug a Vertex Shader, Oct. 11, 2010, (Retrieved date) 6 pages.
DirectX Software Development Kit, Oct. 11, 2010, (Retrieved Date) 4 pages.
D3DXSHADER Flags, Sep. 14, 2010, 4 pages.
Greg Watson, "PTP Design Document", Nov. 10, 2007, 12 pages.
Gregory Pakosz, "How to Debug DirectX 11 Compute Shader?", Dec. 19, 2009, 1 page.
PIX, Oct. 11, 2010 (Retrieved Date), 2 pages.
NVIDIA Parallel Nsight, Sep. 22, 2010, 2 pages.
Appendix B: Debugging and Profiling Parallel Applications, Pub. Date: 2010, 9 pages.
OPENSOURCEPROJECT.OGR.CN, "Debugging Multiple Tasks", 2007, 5 pages.
Banks, "C Support for Multiple Address Spaces in Embedded Systems", May 31, 2001, 5 pages.
Unix International, "DWARF Debugging Information Format", Jul. 27, 1993, 108 pages.
Watson, Greg, et al., "Relative Debugging for Data-Parallel Programs: A ZPL Case Study", Oct. 2000 IEEE, pp. 42-52.
NVIDIA Compute, "PTX: Parallel Thread Execution" ISA Version 1.1, Oct. 24, 2007, 93 pages.
Bleisweiss, Avi, "Shading Compilers", Based on information and belief available, at least as early as Jan. 3, 2011, 22 pages.
Lejdfors, Calle, et al., "PyFX: A Framework for Programming Real-Time Effects", at least as early as Jan. 3, 2011, 12 pages.
Office Action dated May 9, 2013 cited in U.S. Appl. No. 12/969,482 (Copy Attached).

* cited by examiner

TRANSFORMING ADDRESSING ALIGNMENT DURING CODE GENERATION

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

One mechanism for generating executable code is compilation. At compile time, a compiler receives a source level description of an algorithm written in a higher level programming language. The compiler is tasked with generating executable code for a target environment from the source level description. At runtime, the executable code is run in the target environment.

Compilers for targeting a source language (e.g., C++) to data-parallel platforms (e.g., High Level Shader Language ("HLSL") and DirectX) are often built from existing general purpose compilers for general purpose languages (e.g., C++). The source program is translated to a low-level Intermediate Representation ("IR") that is suitable for code analysis and optimizations. The IR is then translated (e.g., further compiled) to the target language.

The IR is often designed for general-purpose languages and platforms, where addressing alignment is typically (single) byte aligned. However, the target data-parallel language may not support byte-alignment. For example, the minimal alignment for HLSL is 4-bytes (32-bits). Thus, for an offset to a memory resource, a stride of 1 means 4-bytes stride in memory. To compensate, generated code typically includes extra arithmetic operations to account for the different addressing alignment.

For example, for the following C++ source code:

```
int * p = &r;
p = p + i;
// ...
v = *p;
```

Generated IR (e.g., IR for general purpose C++ compiler) may look like:

```
p = &r;
p = p + i * 4; // "*4" is introduced in IR to conform to byte-addressing
// ...
v = [p]
```

Within the IR it is known that p is a byte-aligned offset for addressing. It is also known that is p is a multiple of 4 (assuming this is a restriction of, for example, C++ extended for parallel environments and that the code is targeting parallel devices).

When generating target (e.g., HLSL) code arithmetic operations are used to compensate. Thus, generated target (e.g., HLSL) code may look like:

```
p_offset = 0;
p_offset = p_offset + i * 4;
// ......
v = r[p_offset/4];  // Assume compiler knows "p" points to resource "r",
                    and
                    //in the target language, resource "r" is 4-bytes
                    aligned
                    //So change to 4-byte addressing, a stride of 1 for "r"
                    //means 4-bytes.
```

The "*4" and "/4" operations in the above example target code can be pervasive when generated from an IR used by a general purpose compiler, for example, a C/C++ compiler. Generally, multiplication and division operations are relatively expensive operations. As such, pervasiveness of multiplication and division operations can significantly degrade runtime performance. Further, a target compiler, for example, for compiling IR into HLSL bytecode, often lacks sufficient semantic information to determine if arithmetic operations in IR originated from user source code or were included to compensate for the addressing alignment of IR.

BRIEF SUMMARY

The present invention extends to methods, systems, and computer program products for transforming addressing alignment during code generation. A plurality of lower level instructions of lower level code is accessed. The plurality of lower level instructions was translated from corresponding statements and expressions of higher level code. The statements and expressions from the higher level code define and use one or more symbols representing offsets in an address space memory resource in accordance with a first addressing alignment.

For each of the plurality of symbols, a symbol offset flag corresponding to the symbol is defined. Each symbol offset flag has a value of TRUE or FALSE. A value of FALSE indicates that the symbol represents the offset in accordance with the first addressing alignment. A value of TRUE indicates that the symbol represents an offset in accordance with a second addressing alignment. Each symbol offset flag is initialized to FALSE.

For each of the plurality of lower level instructions, an instruction offset flag corresponding to the lower level instruction is defined. Each instruction offset flag has a value of TRUE or FALSE. A value of TRUE indicates that the instruction has been processed to define an offset in accordance with the second addressing alignment. Each instruction offset flag is initialized to FALSE.

Each location in the lower level code where instructions dereference a pointer is identified. For each identified location, a symbol offset flag for the symbol representing the pointer is set to TRUE. One or more lower level instructions are iteratively identified. The one or more iteratively identified lower level instructions have a destination operand symbol with a symbol offset flag set to TRUE and have an instruction offset flag set to FALSE.

For each of the one or more iteratively identified lower level instructions, the lower level instruction is processed to change the lower level instruction to comply with the second addressing alignment. Processing the lower level instruction includes modifying at least one source operand symbol of the lower level instruction to have addressing alignment based on the second addressing alignment. Processing the lower level instruction also includes setting the instruction offset flag for the lower level instruction to TRUE.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
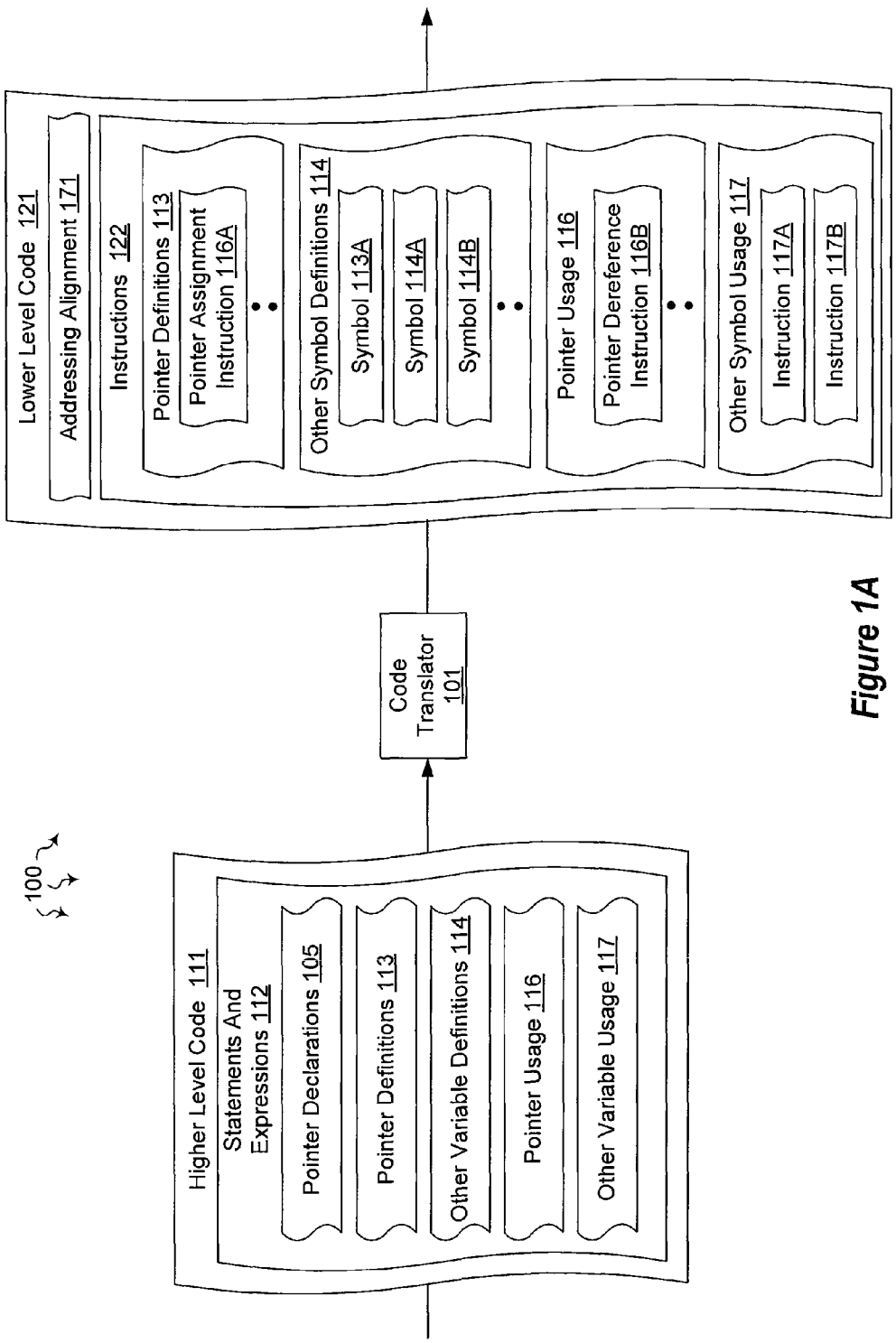
FIGS. 1A-1C illustrate an example computer architecture that facilitates transforming addressing alignment during code generation.

The present invention extends to methods, systems, and computer program products for transforming addressing alignment during code generation. A plurality of lower level instructions of lower level code is accessed. The plurality of lower level instructions was translated from corresponding statements and expressions of higher level code. The statements and expressions from the higher level code define and use one or more symbols representing offsets in an address space memory resource in accordance with a first addressing alignment.

For each of the plurality of symbols, a symbol offset flag corresponding to the symbol is defined. Each symbol offset flag has a value of TRUE or FALSE. A value of FALSE indicates that the symbol represents the offset in accordance with the first addressing alignment. A value of TRUE indicates that the symbol represents an offset in accordance with a second addressing alignment. Each symbol offset flag is initialized to FALSE.

For each of the plurality of lower level instructions, an instruction offset flag corresponding to the lower level instruction is defined. Each instruction offset flag has a value of TRUE or FALSE. A value of TRUE indicates that the instruction has been processed to define an offset in accordance with the second addressing alignment. Each instruction offset flag is initialized to FALSE.

Each location in the lower level code where instructions dereference a pointer is identified. For each identified location, a symbol offset flag for the symbol representing the pointer is set to TRUE. One or more lower level instructions are iteratively identified. The one or more iteratively identified lower level instructions have a destination operand symbol with a symbol offset flag set to TRUE and have an instruction offset flag set to FALSE.

For each of the one or more iteratively identified lower level instructions, the lower level instruction is processed to change the lower level instruction to comply with the second addressing alignment. Processing the lower level instruction includes modifying at least one source operand symbol of the lower level instruction to have addressing alignment based on the second addressing alignment. Processing the lower level instruction also includes setting the instruction offset flag for the lower level instruction to TRUE.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including combinations having one or more of: personal computers, desktop computers, laptop computers, message processors, hand-held devices, multi-processor systems (including systems with a one or more Central Processing Units ("CPUs") and one or more co-processors, for example, Graphical Processing Units ("GPUs") or accelerators), microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, embodiments of the invention use a compiler transformation to transform lower level code from one address alignment to another address alignment. The transformation can be based upon assumptions of a source programming language. Based on the assumptions, the transformation can eliminate arithmetic operations that compensate for different addressing alignment, resulting in more efficient code.

Some particular embodiments use a compiler transformation to transform an Intermediate Representation ("IR") from one-byte addressing alignment into multi-byte (e.g., four-byte) addressing alignment. The compiler transform may be based on the assumption that source program languages (e.g., C++ extended for parallel environments) target data parallel devices (e.g., Graphical Processing Units ("GPUs")) using source programs with constraints (e.g., C++ extended for parallel environments). One constraint in a source program can be that the source program accesses memory using the same alignment as the target language. As such, transformations are able to eliminate most of the arithmetic operations in the IR that compensate for different addressing alignment.

Figure 1B:
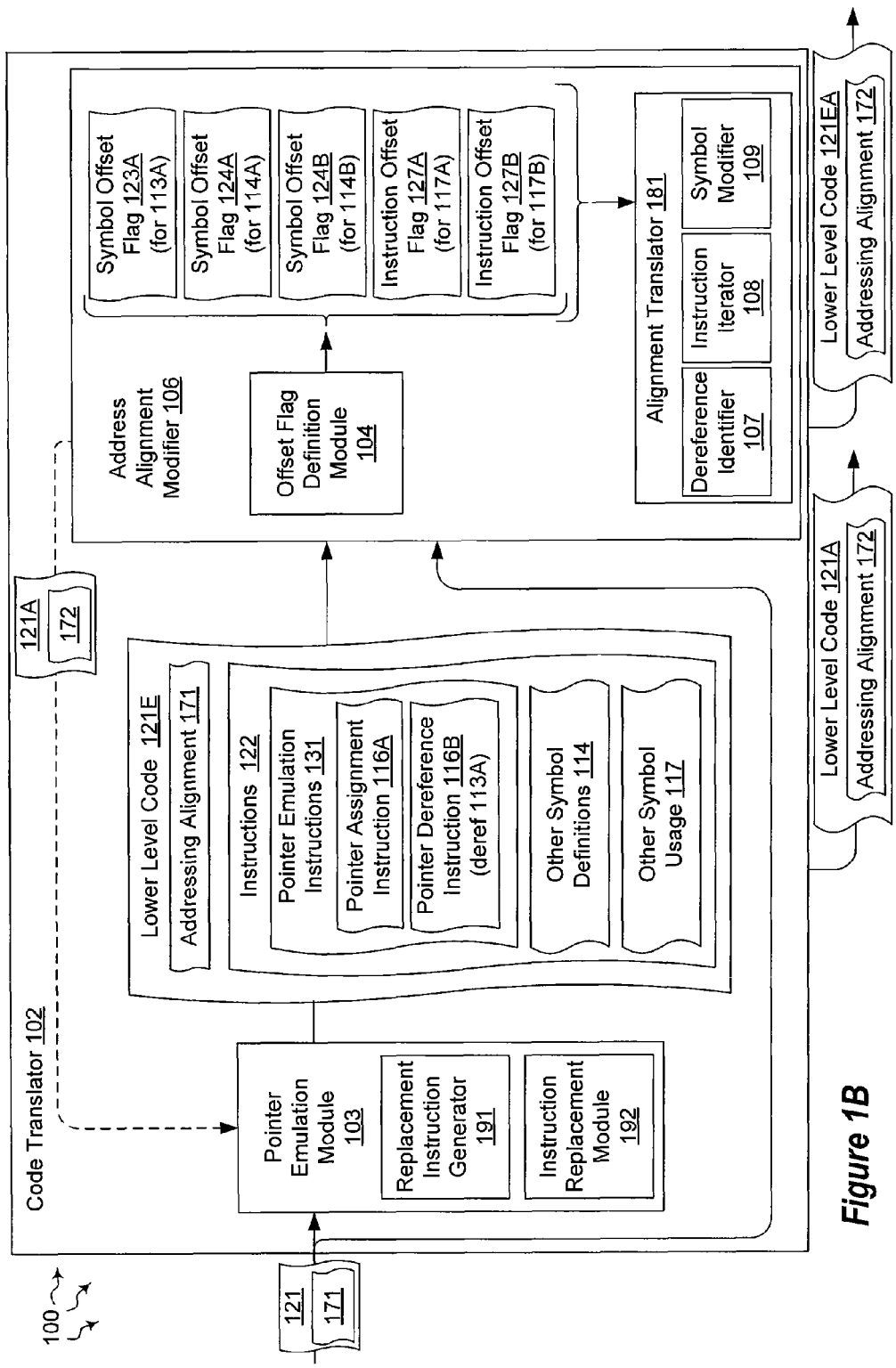
Figure 1C:
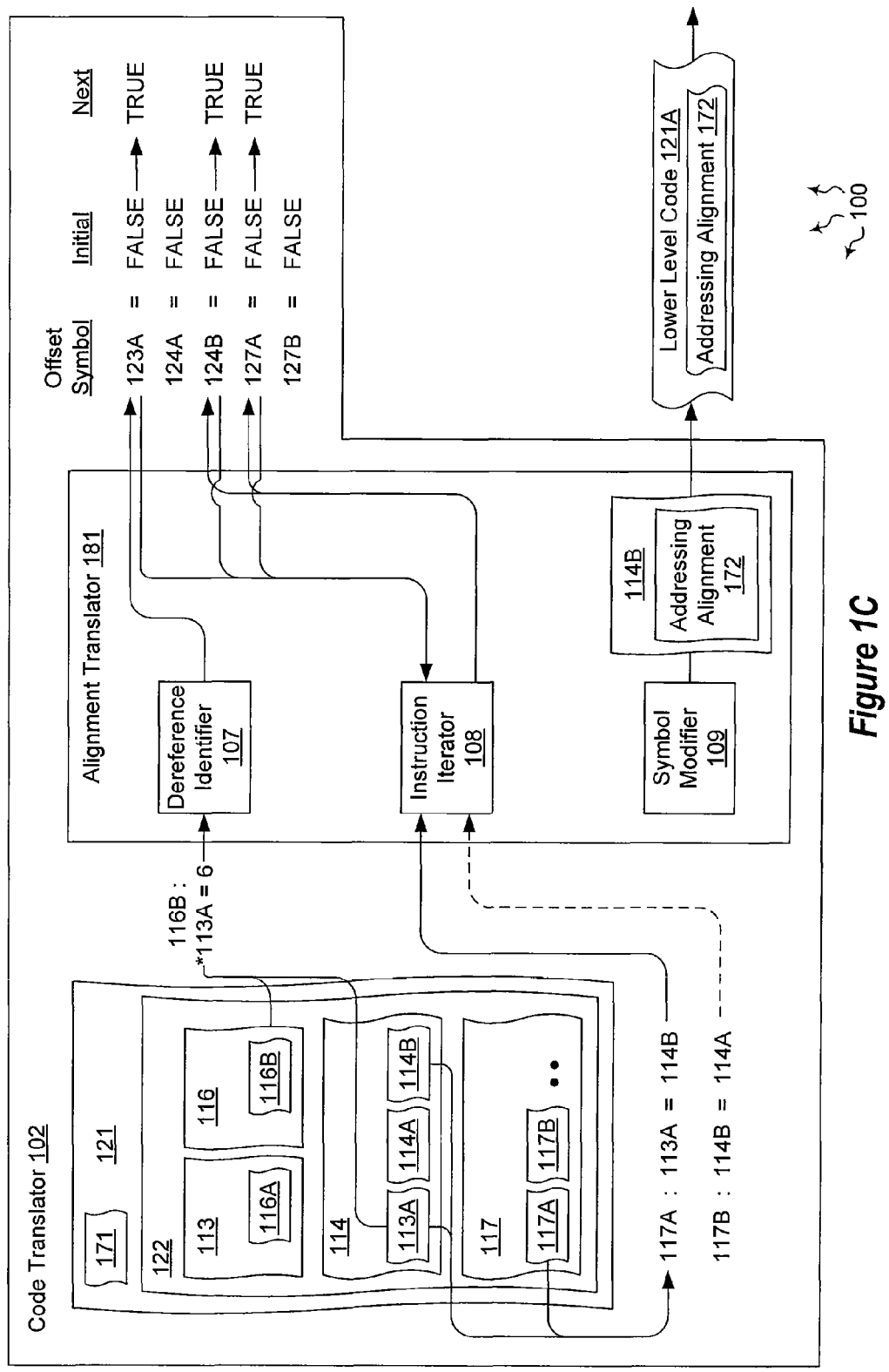

FIGS. 1A-1C illustrates an example computer architecture 100 that facilitates translating addressing alignment during code generation. Referring to FIGS. 1A-1C, computer architecture 100 includes code translator 101 and code translator 102. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Referring more specifically to FIG. 1A, code translator 101 is generally configured to translate (e.g., compile) expressions and statements of higher level code (of a first format) into instructions of lower level code. The higher level code can be in a general purpose programming language, such as, for example, C++, Visual Basic, etc. The lower level code can be an intermediate representation ("IR") of the higher level code that captures appropriate information about the expressions and statements of higher level code (of the first format).

Turning to FIG. 1B, code translator 102 is generally configured to translate the addressing alignment of lower level code. As depicted, code translator 102 includes pointer emulation module 103 and address alignment modifier 106.

When a target language and platform has a plurality of address spaces, pointer emulation can be used to appropriately access locations within the plurality of address spaces. Pointer emulation module 103 is configured to replace lower level code (IR instructions) defining and using pointers with other lower level code (other IR instructions) emulating the definition and use of pointers. As depicted, pointer emulation module 102 includes replacement instruction generator 191 and instruction replacement module 192.

Replacement instruction generator 191 is configured to generate pointer emulation instructions for pointer definitions and pointer usage. For example, replacement instruction generator 191 can receive (potentially inlined) lower level code (e.g., IR instructions) containing pointer definitions and pointer usage. Replacement instruction generator 191 can generate pointer emulation instructions (e.g., emulation IR instructions) to emulate the pointer definitions and pointer usage. Pointer emulation instructions can include array definitions, variable assignments, tag variable definitions, offset variable definitions, pointer definition instructions, pointer assignment instructions, and pointer dereference instructions.

Generating pointer emulation instructions can include defining one or more arrays, the one or more arrays for storing the set of local variables and the set of shared variables. In general, arrays can be used to map to memory that is not otherwise directly indexable. Array definitions can define one or more arrays for storing a set of local variables and a set of shared variables defined in statements and expressions of higher level code. When appropriate, an array can also be defined for global variables.

In some embodiments, one array is defined for the set of local variables and one array is defined for the set of shared memory variables. In other embodiments, two or more arrays are defined for the set of local variables. For example, a first local array can be defined for local variables that are dereferenced using a known (e.g., compile-time) offset. A second local array can be defined for other local variables. Likewise, two or more arrays can be defined for the set of shared memory variables. For example, a first shared memory array can be defined for shared memory variables that are dereferenced using a known offset. A second shared memory array can be defined for other shared memory variables.

In further embodiments, a unique array is defined for each local variable and for each shared memory variable. Various combinations of array definitions are also possible. For example, a shared memory array can be defined for shared memory variables, a local array can be defined for local variables that are dereferenced using known offsets, or a unique local array defined for each other local variables.

Generating pointer emulation instructions can also include assigning each local variable and each shared variable to a position in one of the one or more arrays. Assignment to an array can include assignment to an array shared with other variables or assignment to a unique array for a variable.

Generating pointer emulation instructions can also include generating pointer definition instructions. In general, a pair of variables can be defined to represent a pointer. Thus, generating pointer emulation instructions can include representing each of one or more pointers by defining a pair of variables. Defining a pair of variables can include defining a tag variable. The tag variable is for storing a value used to identify one of the one or more arrays or global memory resource the emulated pointer is pointing into. Defining a pair of variables can also include defining an offset variable corresponding to the tag variable. The offset variable is for storing a value used to identify an array position.

Generating pointer emulation instructions can also include generating pointer assignment instructions for each location in the lower level code where an address value is assigned to a pointer. Pointer assignment instructions can assign a value to one or more of the a tag variable and a corresponding offset variable to identify a position within in one of the one or more arrays or global memory resources to emulate assigning an address value to a pointer. Generating pointer emulation instructions can also include generating pointer dereference instructions for each location in the lower level code where a pointer is dereferenced. Pointer dereference instructions can assign/read a value to/from a location in one of the one or more the arrays or global memory resources based on the value assigned to a tag variable and the value assigned to a corresponding offset variable to emulate dereferencing a pointer.

Instruction replacement module 192 is configured to replace pointer definitions and pointer usage instructions with generated pointer emulation instructions. Instruction replacement module 192 can receive (potentially inlined) lower level code and pointer emulation instructions. The lower level code can contain pointer definitions and pointer usage. Instruction replacement module 192 can replace pointer definitions, assignments, and dereference instructions with the pointer emulation instructions (generated by replacement instruction generator 191) within the lower level code.

Lower level code containing pointer emulation instructions can then be further translated or compiled into other code formats. In some embodiments, lower level code is translated into expressions and statements of higher level code (of the same or different format as used to generate the lower level code). For example, (potentially inlined) IR instructions can be translated into High Level Shader Language ("HLSL") of DirectX ("DX"), C++, Visual Basic, etc. In other embodiments, lower level code is further compiled. For example, IR instructions can be compiled into HLSL bytecode (for execution on a GPU).

Other types of translations are also possible. For example, further translation can include changing the addressing mode of the (potentially inlined) lower level instructions.

Generally, and whether or not pointer emulation has occurred, address alignment modifier 106 is configured to receive lower level code having one addressing alignment and change the addressing alignment of the lower level code to a another different addressing alignment. Address alignment modifier 106 can refer to symbol and instruction offset flags for the lower level code to facilitate a change in addressing alignments. As depicted, address alignment modifier 106 includes offset flag definition module 104 and alignment translator 181.

Generally, offset flag definition module 104 is configured to receive lower level code and define offset flags for symbols and instructions contained in lower level code. A symbol offset flag can be used to indicate the addressing alignment for a corresponding symbol. The value of a symbol offset flag can indicate whether a corresponding symbol has an original (e.g., one-byte) addressing alignment or a transformed (e.g., four-byte) addressing alignment. An instruction offset flag can be used to indicate processing of an instruction for addressing alignment. The value of an instruction offset flag can indicate whether a corresponding instruction has or has not been processed (e.g., from one-byte addressing alignment) to define a transformed (e.g., four-byte) addressing alignment for its destination operand.

Generally, alignment translator 181 is configured to identify and track symbols and instructions for addressing alignment translations and to translate the addressing alignment of symbols and instructions. Alignment translator 181 further includes dereference identifier 107, instruction iterator 108, and symbol modifier 109. Dereference identifier 107 is configured to identify locations in lower level code where a pointer is dereferenced. Instruction iterator 108 is configured to iterate over lower level instructions to identify lower level instructions having an instruction offset flag of a specified value (e.g., FALSE). Symbol modifier 109 is configured to modify the addressing alignment of a symbol, such as, for example, from one addressing alignment to another addressing alignment.

Turing back to FIG. 1A, code translator 101 can access higher level code 111 (e.g., C++ extended for parallel environments source code). Higher level code 111 includes statements and expressions 112 including pointer declarations 105, pointer definitions 113, other variable definitions 114, pointer usage 116, and other variable usage 117. Pointer declarations 105 declare one or more pointers, such as, for example, "int*p;". Pointer definitions 113 include one or more pointer definitions. A pointer can be defined in a variety of different ways including (but not limited to):

---

| | |
|---|---|
| p = &a; | //define a pointer "p" by assigning address of variable "a" |
| q = p; | // define a pointer "q" by assigning another pointer "p" |
| o = q +1; | //define pointer "o" via pointer arithmetic. |

---

Pointer usage 116 includes one or more instances of dereferencing a pointer, such as, for example, "*pp=8;" (locate the address p refers to in memory and set the location being addressed to 8).

Code translator 101 can translate higher level code 111 into lower level code 121 (e.g., an IR). Lower level code 121 has addressing alignment 171 (e.g., one-byte addressing alignment).

Although in a different format, lower level code 121 includes instructions 122 representing pointer definitions 113, other symbol definitions 114, pointer usage 116, and other symbol usage 117. As further depicted, pointer definitions 113 includes pointer assignment instruction 116A, other symbol definitions 114 define symbols 113A, 114A and 114B, pointer usage 116 includes pointer dereference instruction 116B, and other symbol usage 117 includes instructions 117A and 117B.

Code translator 101 can forward lower level code 121 to code translator 102. Code translator 102 can receive lower level code 121 from code translator 101.

In some embodiments, code translator 102 initially forwards received lower level code, such as, for example, lower level code 121, to address alignment modifier 106. For example, pointer emulation module 103 can be bypassed when a target language and platform has a single address space (and thus pointer emulation would provide little, if any, benefit). Even when a target language and platform has a plurality of addresses spaces, it may be that address alignment translation is performed prior to emulating pointer instructions. Lower level code can be sent to pointer emulation module 103 after addressing alignment has been translated for the target language and platform. Pointer emulation module 103 replaces pointer instructions in the (address alignment translated) lower level code with pointer emulation instructions. The lower level code, which is both address alignment translated and includes pointer emulation instructions, can then be output for further processing (e.g., further compilation).

In other embodiments, code translator 102 initially forwards received lower level code, such as, for example, lower level code 121, to pointer emulation module 103. Pointer emulation module 103 replaces pointer instructions in the lower level code with pointer emulation instructions. The lower level code containing the pointer emulation instructions is then sent to address alignment modifier 106. Address alignment modifier 106 can translate the addressing alignment of the lower level code (including pointer emulation instructions). The lower level code, which both includes pointer emulation instructions and is address alignment translated, can then be output for further processing (e.g., further compilation).

For a target language and platform having a plurality of address spaces (and either prior to or after address alignment translation), pointer emulation module 103 can process lower level code 121 to generate pointer emulation instructions representing pointer definitions 113 and pointer usage 116. Replacement instruction generator 191 can generate pointer emulation instructions 131 to emulate pointer definitions 113 and pointer usage 116. Instruction replacement module 192 can replace pointer definitions 113 and pointer usage 116 with pointer emulation instructions 131. Pointer emulation module 103 can output lower level code 121E including pointer emulation instructions 131.

Within pointer emulation instructions 131, a tag and offset variable can be defined to emulate defining a pointer (e.g., symbol 113A). Within pointer emulation instructions 131, pointer assignment instructions can assign a value to one or more of the a tag variable and a corresponding offset variable to identify a position within in one of one or more arrays or global memory resources to emulate assigning an address value to a pointer (e.g., pointer assignment instruction 116A). Within pointer emulation instructions 131, pointer dereference instructions can assign/read a value to/from a location in one of the one or more the arrays or global memory resources, based on the value assigned to a tag variable and the value assigned to a corresponding offset variable, to emulate dereferencing a pointer (e.g., dereference instruction 116B).

Figure 2:
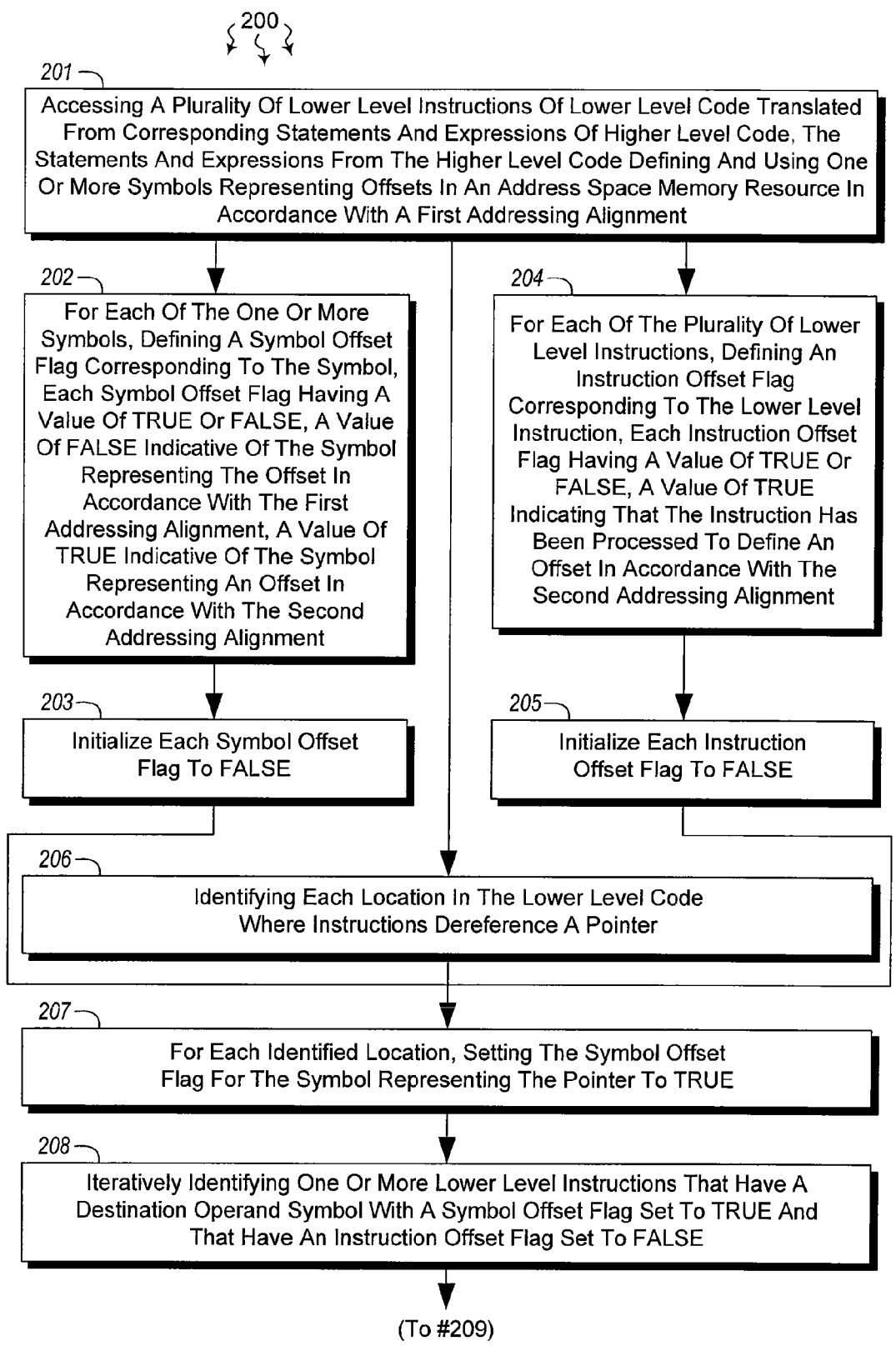
FIG. 2 illustrates a flow chart of an example method for transforming addressing alignment during code generation.
Figure 2:
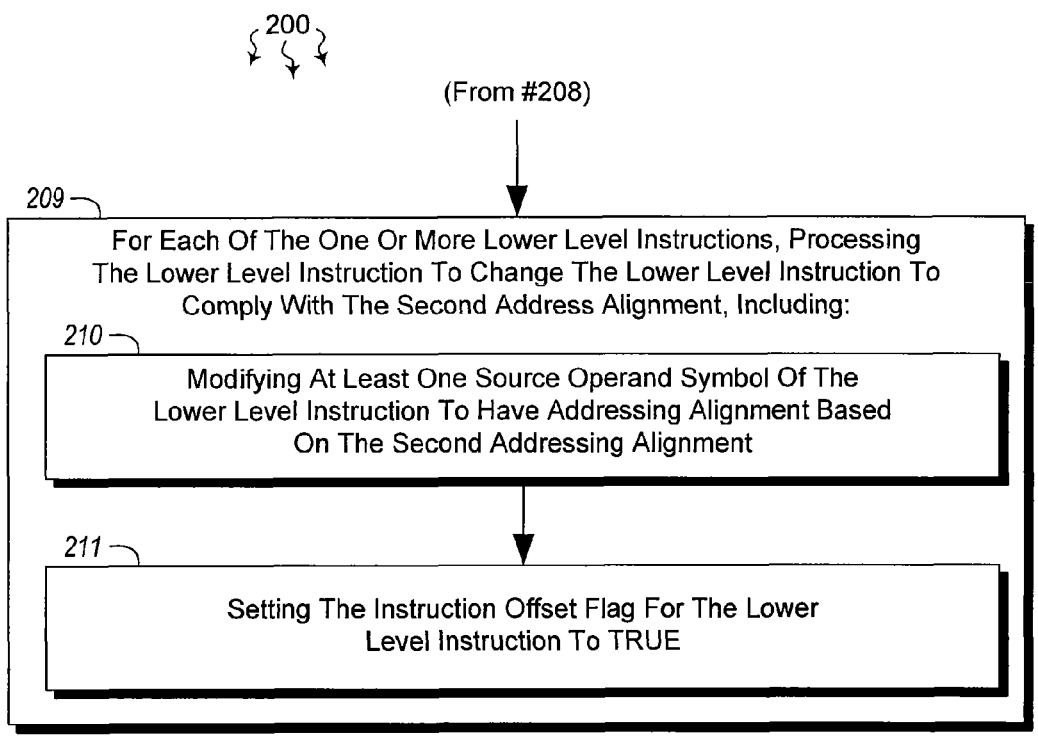

FIG. 2 illustrates a flow chart of an example method 200 for changing addressing mode during code generation. Method 200 will be described with respect to the components and data of computer architecture 100. In general, address alignment modifier 106 processes lower level code 121E or lower level code 121 to translate the addressing mode of lower level code 121E or lower level code 12 from addressing alignment 171 to addressing alignment 172.

Method 200 includes an act of accessing a plurality of lower level instructions of lower level code translated from corresponding statements and expressions of higher level code, the statements and expressions from the higher level code defining and using one or more symbols representing offsets in an addressing space memory resource in accordance with a first addressing alignment (act 201). For example, address alignment modifier 106 can access lower level code 121E (or lower level code 121) having addressing alignment 171.

Method 200 includes for each of the plurality of symbols, an act of defining a symbol offset flag corresponding to the symbol, each symbol offset flag having a value of TRUE or FALSE, a value of FALSE indicative of the symbol representing the first addressing alignment, a value of TRUE indicative of the symbol representing an offset in accordance with the second addressing alignment (act 202). For example, offset flag definition module 104 can define symbol offset flag 123A for symbol 113A, symbol offset flag 124A for symbol 114A, symbol offset flag 124B for symbol 114B, etc. A value of FALSE indicates a symbol having addressing alignment 171 (e.g., a one-byte addressing alignment). A value of TRUE indicates a symbol having addressing alignment 172 (e.g., a four-byte addressing alignment).

Method 200 includes an act of initializing each symbol offset flag to FALSE (act 203). For example, each of symbol offset flag 123A, symbol offset flag 124A, symbol offset flag 124B, etc., can be initialized to FALSE. Initializing symbol offset flag 123A, symbol offset flag 124A, symbol offset flag 124B, etc. to FALSE indicates that symbol 113A, symbol 114A, symbol 114B, etc., have addressing alignment 171 respectively.

Method 200 includes for each of the plurality of lower level instructions, an act of defining an instruction offset flag corresponding to the lower level instruction, each instruction offset flag having a value of TRUE or FALSE, a value of TRUE indicating that the instruction has been processed to define an offset in accordance with the second addressing alignment act (act 204). For example, offset flag definition module 104 can define instruction offset flag 127A for instructions 117A, instruction offset flag 127B for instructions 117B, etc. A value of FALSE indicates that an instruction has not been processed to define an offset in accordance with addressing alignment 172. A value of TRUE indicates that an instruction has been processed to define an offset in accordance with addressing alignment 172.

Method 200 includes an act of initializing each instruction offset flag to FALSE (act 205). For example, offset flag definition module can initialize instruction offset flag 127A, instruction offset flag 127B, etc. to FALSE. Initializing instruction offset flag 127A, instruction offset flag 127B, etc. to FALSE indicates that instructions 117A, 117B, etc. have not been processed to define an offset in accordance with addressing alignment 172.

Method 200 includes an act of identifying each location in the lower level code wherein instructions deference a pointer (act 206). For example, turning now to FIG. 1C, dereference identifier 107 can identify pointer dereference instruction 116B dereferencing symbol 113A. As depicted, for lower level code 121, dereference instruction 116B is contained in pointer usage 116. For lower level code 121E (in FIG. 1B), dereference instruction 116B is contained in emulation instructions 131. For each identified location, method 200 includes an act of setting the symbol offset flag for the symbol representing the pointer to TRUE (act 207). For example, dereference module 107 can set pointer offset symbol 123A to TRUE.

Method 200 includes an act of iteratively identifying one or lower level instructions that have a destination operand symbol with a symbol offset flag set to TRUE and that have an instruction offset flag set to FALSE (act 208). For example, instruction iterator 108 can identify instruction 117A. Instruction 117A has a destination operation (113A) with symbol offset flag (123A) set to TRUE and instruction offset flag 127A is set to FALSE.

For each of the one or more lower level instructions, an act of processing the lower level instruction to change the lower level instruction to comply with the second addressing alignment (act 209). For example, address alignment modifier 106 can process instruction 117A to change instruction 117A to comply with addressing alignment 172. Act 209 includes an act of modifying at least one source operand symbol of the lower level instruction to have addressing alignment based on the second addressing alignment (act 210). For example, symbol modifier 109 can modify symbol 114B to have addressing alignment 172.

Act 209 includes an act of setting the instruction offset flag for the lower level instruction to TRUE (act 211). For example, instruction iterator 108 can set instruction offset flag 127B to TRUE. Instruction iterator 108 can also set symbol offset flag 124B to TRUE. Thus, on subsequent iterations through lower level code 121E, instruction iterator 108 can determine that instruction 117A has already been processed and that symbol 114B has addressing alignment 172.

For example, instruction iterator 108 can identify instruction 117B as the next instruction that has not been processed and that has a destination operation having addressing alignment 172. As such, symbol modifier 109 can modify symbol 114A to have addressing alignment 172. Instruction iterator 108 can set instruction offset flag 127B to TRUE. Instruction iterator 108 can also set symbol offset flag 124A to TRUE. Thus, on subsequent iterations through lower level code 121E, instruction iterator 108 can determine that instruction 117B has already been processed and that symbol 114A has addressing alignment 172. Iterations can continue until no further instructions are processed for any identified dereference locations.

When all addressing alignment changes are implemented, address alignment modifier 106 can output lower level code 121A or lower level code 121EA having address alignment 172. Lower level code 121A or lower level code 121EA can be further compiled to generate HLSL bytecode for execution on a GPU. Since code translator 102 has already performed (potentially significant) addressing alignment translations, the number of arithmetic operations generated in a target language (e.g. in HLSL) is reduced. For example, p1=p2*4;

is changed to:

p1=p2*1;

which can then be further changed to:

p1=p2;

In some embodiments, for each symbol in IR, an "isDwordOffset" flag is introduced. When the isDwordOffset flag is set to TRUE, the symbol represents a 4-byte (Dword) offset. Thus, when such an offset strides by 1, it strides 4-bytes (32-bits) in memory. For symbol "x", SY_ISDWORDOFFSET(x) returns the value of the flag for "x". Initially, the isDwordOffset flag is set to FALSE for all symbols. When a symbol is marked, this refers to the symbol's "isDwordOffset" flag being marked.

Further, for each instruction in the IR, an "isDwordOffset" flag is introduced. When the "isDwordOffset" flag is set to TRUE, the instruction has been processed to use 4-byte (dword) offset. Also, the "isDwordOffset" flag for one or more destination operands (a symbol) are set to TRUE. For instruction "x", INS_ISDWORDOFFSET(x) returns the value of the flag. Initially, the "isDwordOffset" flag is set to false for all instructions. When an instruction is marked, this refers to the instruction's "isDwordOffset" flag being marked.

Then, in the first pass of the transformation, the following instructions are execution to identify pointer emulation instructions:

```
foreach(instr in IR) {
    if (instr is a pointer dereference) {
        SY_ISDWORDOFFSET(SY_PTRARG(instr)) = true; //
SY_PTRARG returns the pointer operand being dereferenceed.
    }
}
```

Subsequently, a do/while loop is started, which terminates when there is no more symbol's "isDwordOffset" flag being marked to TRUE in the current iteration. The algorithm is flow-insensitive.

In each iteration, all instructions can be scanned. Scanning can go forward or backward through the IR. For each instruction, if the "isDwordOffset" flag of its destination operand has been marked toTRUE, and the instruction itself has not been marked (its "isDwordOffset" flag is FALSE), the instruction is processed by transforming its source operands to represent dword offsets.

The transforming can apply primarily (or even exclusively) to specified instructions related pointer arithmetic. For example, for instructions such as assignment, addition, and subtraction, all the source operands contribute to the addressing alignment of the destination operand. Source operands are scanned. If a source operand is an integer constant, and the value "v" is divisible by 4, the constant operand is replaced with constant value "v/4". If the source operand is not an integer constant and its "isDwordOffset" flag for the source operand is FALSE, the "isDwordOffset" flag is set to TRUE. As such, instructions with this symbol as their destination operand will be processed later. The "isDwordOffset" flag for the instruction is also set to TRUE, so that it is not processed further.

For multiplication instructions, a single source operand can contribute to the address alignment of the destination source operand. If one source operand is an integer constant of value 0, no processing occurs and the "isDwordOffset" flag for the instruction is set to TRUE. If one of source operands is an non-zero integer constant "v" and divisible by 4, it is replaced with constant "v/4", and the "isDwordOffset" flag for the instruction is set to TRUE. If none of source operands is an integer constant that divisible by 4, other mechanisms are used.

These transformations can be used to transform:

| Instr 0 | t1 = t2 * t3; | // SY_ISDWORDOFFSET(t1) = true, INS_ISDWORDOFFSET(Instr 0) = false |
|---|---|---|
| to: | | |
| Instr 1: | tmp = t2 * t3; | // SY_ISDWORDOFFSET(tmp) = false, INS_ISDWORDOFFSET(Instr 1) = false |

-continued

| Instr 2: | t1 = tmp >> 2; // SY__ISDWORDOFFSET(t1) = true, INS__ISDWORDOFFSET(Instr 2) = false |
|---|---|

The "isDwordOffset" flag for "instr 2" is set to TRUE, so it is not further processed. he is DwordOffset" flag for tmp symbol is set to FALSE, so "instr 1" is not further processed either.

For shift right, the second source operand is checked to determine if the second source operand is an integer constant "v" that is greater than or equal to 2. If so, the operand is changed to constant "v−2", and is DwordOffset" flag for the instruction is set to TRUE. Otherwise, a transformation similar to multiplication is used. These transformations can be used to transform:

| Instr 0 | t1 = t2 >> t3; // SY__ISDWORDOFFSET(t1) = true, INS__ISDWORDOFFSET(Instr 0) = false |
|---|---|
| to: | |
| Instr 1: | tmp = t2 >> t3; // SY__ISDWORDOFFSET(tmp) = false, INS__ISDWORDOFFSET(Instr 1) = false |
| Instr 2: | t1 = tmp >> 2; // SY__ISDWORDOFFSET(t1) = true, INS__ISDWORDOFFSET(Instr 2) = false |

For an instruction that has one source operand's "isDwordOffset" flag set to TRUE, but the destination operand's is DwordOffset" flag set to FALSE flag, the is DwordOffset" flag for the destination operand is set to TRUE. Thus the instruction is to be processed later. For a specified case, when the instruction is a comparison. The instruction can compare two pointers, with a Boolean result. For such instructions, if the "isDwordOffset" flag for one source operand is TRUE, the is DwordOffset" flag for the destination operand is set to FALSE. However, the is DwordOffset" flag for the other source operand is set to TRUE.

The algorithm converges (the loop terminates) when no more symbol is marked during an iteration. After the transformation, pointer dereferences use 4-byte addressing offset instead of 1-byte addressing offset. Thus when target HLSL code is generated, there is no further need to divide the offset by 4. Moreover, many, if not all, "*4" operations (e.g., generated by the compiler when translated from source program to IR) are also eliminated.

A code based example of translating addressing alignment for code without pointer emulation instructions is now provided. Before translation the following example, code can be accessed (e.g., by address alignment modifier 106):

$L1:p=\&a+4;$ $L2:q=p+8;$ $L3:*q=5;$

Initially, symbol offset flags (SYM_ISDWORDOFFSET( )) for p and q are FALSE and instruction offset flags (INST_ISDWORDOFFSET( )) for L1, L2, and L3) are FALSE.

In a first step, SYM_ISDWORDOFFSET(q)=TRUE

In a second step, since INST_ISDWORDOFFSET (L2)= FALSE but SYM_ISDWORDOFFSET(DST_OPER(L2))= SYM_ISDWORDOFFSET(q)=TRUE, L2 is transformed to:

$q=p+2;$ and set SYM_ISDWORDOFFSET(p)=TRUE, INSTR_ISDWORDOFFSET ((L2)=TRUE.

In a third step, since INST_ISDWORDOFFSET ((L1))= FALSE, but SYM_ISDWORDOFFSET (DST_OPR(L1))= SYM_ISDWORDOFFSET (p)=TRUE, L1 is transformed to:

$p=\&a+1;$ and set INSTR_ISDWORDOFFSET ((1))=TRUE.

So after these three steps, we have IR as:

$L1:p=\&a+1;$ $L2:q=p+2;$ $L3:*q=5;$

The IR can then be sent to a pointer emulation module (e.g., pointer emulation module 103) for further processing.

In some embodiments, the safety of performing the address alignment transformation is checked prior to the transformation. If it is determined to be not safe for performing the transformation, the transformation will be skipped. A safe condition can depend on a language restriction or the result from optimizations and analysis.

After address translation, IR can be re-rechecked to determine if a symbol that represents an offset for addressing somewhere in the IR represents an offset for addressing in the whole IR. When this condition is not true, further code modifications can be made to compensate.

For example, consider the example instruction:

t1=src op t2.

When SY_DWORDOFFSET(src)==TRUE and SY_DWORDOFFSET(t1)==FALSE, "src" was marked as a dword-offset during the transformation (driving by other instructions). However, t1 is not dword-offset.

As such, some other instruction iteratively uses t1 and eventually leads to a pointer dereference. Thus, "t1" is used for a purpose other than offset for addressing. On the other hand, "src" is changed, since "src" is eventually used for addressing. So "src" is dual-purpose in the program. "Src" is in a chain for dereferencing and "src" is also used to define "t1", which is not for dereferencing. Since we have changed "src", we have to make a compensatory change for "t1", such as, for example, change.

t1=src op t2.

to:

$t3=src<<2;(or\ t3=src*4)$ t1=t3op t2.

In embodiments on the invention, the interpretation of TRUE and FALSE for symbol offset flag values and/or instruction offset flag values is reversed. Further, in other embodiments, data structures other than Boolean flags can be used to indicate when address alignment for a symbol has or has not been changed (e.g., from one-byte to four-byte alignment) and when instructions have or have not been processed for a change in address alignment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a method for transforming the addressing alignment used in lower level code, the method comprising:
   an act of accessing a plurality of lower level instructions of lower level code translated from corresponding statements and expressions of higher level code, the statements and expressions from the higher level code defining and using one or more symbols representing offsets in an address space memory resource in accordance with the first addressing alignment;
   for each of the one or more of symbols, an act of defining a symbol offset flag corresponding to the symbol, each symbol offset flag having a value of TRUE or FALSE, a value of FALSE indicative of the symbol representing the offset in accordance with the first addressing alignment, a value of TRUE indicative of the symbol representing an offset in accordance with the second addressing alignment;
   an act of initializing each symbol offset flag to FALSE;
   for each of the plurality of lower level instructions, an act of defining an instruction offset flag corresponding to the lower level instruction, each instruction offset flag having a value of TRUE or FALSE, a value of TRUE indicating that the instruction has been processed to define an offset in accordance with the second addressing alignment;
   an act of initializing each instruction offset flag to FALSE;
   an act of identifying each location in the lower level code where instructions deference a pointer;
   for each identified location:
      an act of setting the symbol offset flag for the symbol representing the pointer to TRUE;
      an act of iteratively identifying one or more lower level instructions that have a destination operand symbol with a symbol offset flag set to TRUE and that have an instruction offset flag set to FALSE;
      for each of the one or more lower level instructions, an act of processing the lower level instruction to change the lower level instruction to comply with the second addressing alignment, including:
         an act of modifying at least one source operand symbol of the lower level instruction to have addressing alignment based on the second addressing alignment; and
         an act of setting the instruction offset flag for the lower level instruction to TRUE.

2. The method as recited in claim 1, wherein the act of accessing a plurality of lower level instructions of lower level code translated from corresponding statements and expressions of higher level code comprises an act of accessing Intermediate Representation IR that is to be used to generate HLSL bytecode for execution on a Graphical Processing Unit ("GPU").

3. The method as recited in claim 1, further comprising after all instructions in the lower level code have been processed, an act of sending the lower level code, including modified instructions having the second addressing alignment, to a pointer emulation module.

4. The method as recited in claim 1, further comprising after all instructions in the lower level code have been processed, an act of sending the lower level code, including modified instructions having the second addressing alignment, to a compiler, the compiler configured to compile the lower level code into machine readable instructions.

5. The method as recited in claim 1, wherein an act of accessing a plurality of lower level instructions of lower level code translated from corresponding statements and expressions of higher level code comprises an act of accessing lower level instructions from a pointer emulation module, the lower level instructions containing pointer emulation instructions.

6. The method as recited in claim 5, wherein the act of identifying each location in the lower level code where instructions deference a pointer comprises an act of identifying each location within the pointer emulation instructions where instructions dereference a pointer.

7. The method as recited in claim 1, wherein the act of modifying at least one source operand symbol of the lower level instruction comprises an act of modifying a first source operand symbol and a second source operand for a pointer arithmetic operation where both the first source operand symbol and a second source operand symbol contributes to the addressing alignment of the destination source operand.

8. The method as recited in claim 1, wherein the pointer arithmetic operation is one of an addition operation or a subtraction operation.

9. The method as recited in claim 8, wherein the act of modifying a first source operand symbol and a second source operand comprises an act of determining the second source operand is an integer that is divisible by four and replacing the second source operand with the quotient of the integer divided by four.

10. The method as recited in claim 1, wherein the act of modifying at least one source operand symbol of the lower level instruction comprises of an act of modifying a source operand for a pointer arithmetic operation wherein only the one source operand symbol contributes to the addressing alignment of the destination source operand.

11. The method as recited in claim 10, wherein the pointer arithmetic operation is a multiplication operation.

12. The method as recited in claim 11, wherein the act of modifying a first source operand symbol comprises an act of determining that a source operand is an integer divisible by four and replacing the source operand with the quotient of the integer divided by four.

13. The method as recited in claim 10, wherein the pointer arithmetic operation is a shift right operation.

14. The method as recited in claim 13, wherein the act of modifying a first source operand symbol comprises an act of determining that a source operand is an integer that is greater than or equal to two and replacing the source operand with the difference of the integer minus two.

15. The method as recited in claim 1, wherein the first addressing alignment is one-byte addressing alignment and the second addressing alignment is four-byte addressing alignment.

16. A computer program product for use at a computer system, the computer program product for implementing a method for changing the addressing used in lower level code from a first addressing alignment to a second addressing alignment, the computer program comprising one or more computer storage devices having stored thereon computer-executable instructions that, when executed at a processor, cause the computer system to perform the method, including the following
   access a plurality of lower level instructions of lower level code translated from corresponding statements and expressions of higher level code, the plurality of lower level instructions representing statements and expressions from the higher level code that define a plurality of symbols using an addressing offset in accordance the first addressing alignment;

for each of the plurality of symbols, define a symbol offset flag corresponding to the symbol, each symbol offset flag having a value of TRUE or FALSE, a value of FALSE indicative of the symbol representing the first addressing alignment, a value of TRUE indicative of the symbol representing an offset in accordance with the second addressing alignment;

set each symbol offset flag to FALSE;

for each of the plurality of lower level instructions, define an instruction offset flag corresponding to the lower level instruction, each instruction offset flag having a value of TRUE or FALSE, a value of TRUE indicating that the instruction has been processed to define an offset in accordance with the second addressing alignment;

set each instruction offset flag to FALSE;

identify each location in the lower level code wherein pointer emulation instructions deference a pointer;

for each identified location:
  set the symbol offset flag for the symbol representing the pointer to TRUE;
  iteratively identify one or more lower level instructions that have a destination operand symbol with a symbol offset flag set to TRUE and that have an instruction offset flag set to FALSE;
  for each of the one or more lower level instructions, process the lower level instruction to change the lower level instruction to comply with the second addressing alignment, including:
    modify at least one source operand symbol of the lower level instruction to have addressing alignment based on the second addressing alignment; and
    set the instruction offset flag for the lower level instruction to TRUE.

17. The computer program product as recited in claim 16, wherein computer-executable instructions that, when executed, cause the computer system to access a plurality of lower level instructions of lower level code translated from corresponding statements and expressions of higher level code comprise computer-executable instructions that, when executed, cause the computer system to access Intermediate Representation ("IR") that is to be used to generate HLSL bytecode for execution on a Graphical Processing Unit ("GPU").

18. The computer program product as recited in claim 16, wherein computer-executable instructions that, when executed, cause the computer system to accessing a plurality of lower level instructions of lower level code translated from corresponding statements and expressions of higher level code comprise computer-executable instructions that, when executed, cause the computer system to access lower level instructions from a pointer emulation module, the lower level instructions containing pointer emulation instructions.

19. The computer program product as recited in claim 18, wherein computer-executable instructions that, when executed, cause the computer system to identify each location in the lower level code where instructions deference a pointer comprise computer-executable instructions that, when executed, cause the computer system to identify each location within the pointer emulation instructions where instructions dereference a pointer.

20. At a computer system including one or more processors and system memory, a method for changing the addressing used in lower level code from a first addressing alignment to a second addressing alignment, the method comprising:

an act of accessing a plurality of lower level instructions of lower level code translated from corresponding statements and expressions of higher level code, the plurality of lower level instructions representing statements and expressions from the higher level code that define a plurality of symbols using an addressing offset in accordance the first addressing alignment;

for each of the plurality of symbols, an act of defining a symbol offset data structure for the symbol, each symbol offset data structure having one value indicative of the symbol representing the first addressing alignment and another value indicative of the symbol representing an offset in accordance with the second addressing alignment;

an act of setting the value of each symbol offset data structure to indicate that the symbols represent the first addressing alignment;

for each of the plurality of lower level instructions, an act of defining an instruction offset data structure corresponding to the lower level instruction, each instruction offset data structure having one value indicating that the instruction has not been processed to define an offset in accordance with the second addressing alignment and another value indicating that the instruction has been processed to define an offset in accordance with the second addressing alignment;

an act of setting the value each instruction offset flag data structure to indicate that the instructions have not been processed to define an offset in accordance with the second addressing alignment;

an act of identifying each location in the lower level code wherein pointer emulation instructions deference a pointer;

for each identified location:
  an act of setting the symbol offset data structure for the symbol representing the pointer to indicate that the pointer represents an offset in accordance with the second addressing alignment;
  an act of iteratively identifying one or more lower level instructions that have a destination operand symbol with a symbol offset data structure indicating that the pointer represents an offset in accordance with the second addressing alignment and an instruction offset data structure indicating that the instruction has not been processed;
  for each of the one or more lower level instructions, an act of processing the lower level instruction to change the lower level instruction to comply with the second addressing alignment, including:
    an act of modifying at least one source operand symbol of the lower level instruction to have addressing alignment based on the second addressing alignment; and
    an act of setting the instruction offset data structure for the lower level instruction to indicate that the instruction has been processed.

* * * * *